(12) United States Patent
Hatori et al.

(10) Patent No.: US 9,128,240 B2
(45) Date of Patent: Sep. 8, 2015

(54) SPOT-SIZE CONVERTER, MANUFACTURING METHOD THEREOF, AND INTEGRATED OPTICAL CIRCUIT DEVICE

(71) Applicants: FUJITSU LIMITED, Kawasaki-shi, Kanagawa (JP); NEC Corporation, Minato-ku, Tokyo (JP)

(72) Inventors: Nobuaki Hatori, Tsukuba (JP); Masashige Ishizaka, Tokyo (JP); Takanori Shimizu, Tokyo (JP)

(73) Assignees: FUJITSU LIMITED, Kawasaki (JP); NEC Corporation, Tokyo (JP)

( * ) Notice: Subject to any disclaimer, the term of this patent is extended or adjusted under 35 U.S.C. 154(b) by 0 days.

(21) Appl. No.: 14/211,083

(22) Filed: Mar. 14, 2014

(65) Prior Publication Data
US 2014/0294341 A1    Oct. 2, 2014

(30) Foreign Application Priority Data
Mar. 28, 2013    (JP) ................. 2013-068937

(51) Int. Cl.
*G02B 6/12* (2006.01)
*G02B 6/13* (2006.01)
*G02B 6/122* (2006.01)

(52) U.S. Cl.
CPC ........ *G02B 6/12* (2013.01); *G02B 2006/12166* (2013.01); *Y10T 29/4978* (2015.01)

(58) Field of Classification Search
CPC ........... G02B 6/12; G02B 2006/12166; Y10T 29/4978
USPC ........................................... 385/14; 29/407.1
See application file for complete search history.

(56) References Cited

U.S. PATENT DOCUMENTS

| 5,078,516 A * | 1/1992 | Kapon et al. ................... 385/129 |
| 6,684,011 B2 * | 1/2004 | Jeong et al. ..................... 385/43 |
| 7,317,853 B2 * | 1/2008 | Laurent-Lund et al. ........ 385/43 |
| 7,551,826 B2 * | 6/2009 | Taylor ........................... 385/129 |
| 2002/0141682 A1 * | 10/2002 | Ryu et al. ....................... 385/14 |

(Continued)

FOREIGN PATENT DOCUMENTS

JP    H08-313756    11/1996

OTHER PUBLICATIONS

J. Michel, et al.; "An Electrically Pumped Ge-on-Si Laser;" OFC/NFOEC (Optical Fiber Communication Conference); 2012; PDP5A.6 (3 Sheets)/p. 2 of specification.
T. Wang, et al.; "1.3-μm InAs/GaAs quantum-dot lasers monlithically grown on Si substrates;" Optics Express; vol. 19; No. 12; Jun. 6, 2011; pp. 11381-11386 (6 Sheets)/p. 2 of specification.

(Continued)

*Primary Examiner* — Akm Enayet Ullah
(74) *Attorney, Agent, or Firm* — Kratz, Quintos & Hanson, LLP

(57) ABSTRACT

The invention relates to a spot-size converter, a manufacturing method thereof, and an integrated optical circuit device, and ensures easier coupling to the optical fiber and higher accuracy in manufacturing the spot-size converter. A first core that is extended from a first end configured to input/output light toward a second end, and a second core that is formed by a plurality of cores, and formed at a position to be evanescent-coupled to the first core, and moreover extended along a direction from the first end toward the second end are provided, and, on the second core, a third core that has a taper unit and is formed at a position to be evanescent-coupled to the second core in a lamination direction is provided.

12 Claims, 10 Drawing Sheets

(56) References Cited

U.S. PATENT DOCUMENTS

2003/0053756 A1* 3/2003 Lam et al. .................... 385/49
2004/0017962 A1* 1/2004 Lee et al. ...................... 385/14
2007/0242917 A1* 10/2007 Blauvelt et al. ............... 385/14
2012/0321480 A1* 12/2012 Guru Prasad ................ 416/232

OTHER PUBLICATIONS

D. Taillaert, et al.; "An Out-of-Plane Grating Coupler for Efficient Butt-Coupling Compact Planar Waveguides and Single-Mode Fibers;" IEEE Journal of Quantum Electronics; vol. 38; No. 7; Jul. 7, 2002; pp. 949-955 (7 Sheets)/p. 2 of specification.

* cited by examiner

SPOT-SIZE CONVERTER, MANUFACTURING METHOD THEREOF, AND INTEGRATED OPTICAL CIRCUIT DEVICE

CROSS-REFERENCE TO RELATED APPLICATION

This application is based upon and claims the benefit of priority of the prior Japanese Patent Application No. 2013-068937, filed on Mar. 28, 2013, the entire contents of which are incorporated herein by reference.

FIELD

The present invention relates to a spot-size converter, a manufacturing method thereof, and an integrated optical circuit device, and to the spot-size converter, the manufacturing method thereof, and the integrated optical circuit device used for optical interconnection using optical wiring on Si substrates between boards, between chips, in a chip and the like, for example.

BACKGROUND

With an increasing demand for an increase in capacity and speed of data processing, it is pointed out that future computers and integrated circuits have limits in the increase in speed, power saving, and downsizing. As a breakthrough to the limits, there is a need for realization of a device/system in which the optical wiring and an electronic circuit are combined, as well as a need for development of a technical field that uses a new electronic phenomenon of a semiconductor.

Under these circumstances, Si photonics that uses a silicon microprocessing technology to form an optical circuit on a silicon on insulator (SOI) substrate gains attention, and development of an optical interconnection technology that is characterized by the increase in speed, reduction in power consumption, and downsizing has been made actively.

Integration of an optical modulator, a photodetector, and an optical waveguide is needed to form the optical circuit on the Si, and the biggest problem is how to direct light, as a signal, to the waveguide formed on the Si. Although the Si itself does not have an emission mechanism, there is a recent report that laser operation is realized by collectively forming emission materials on the Si. It has been reported that, for example, a Ge laser is formed on the Si (refer to, for example, Optical Fiber Communication Conference (OFC2012), PDP5A), and that a quantum dot laser whose wavelength is in 1.3 μm band is formed on the Si substrate (refer to, for example, Optics Express, 19(12), 1138141386 (2011)).

However, these are still under development, and improvements in characteristics of a threshold current, optical output and the like are needed. A method of inputting light from the outside into the optical circuit and the optical waveguide that are formed on the Si is also examined, other than the method of building the emission mechanism onto the Si substrate. A method of reducing only the width of the waveguide is known as the simplest method, in which low-loss optical coupling is realized by allowing the spot size of a semiconductor laser and the spot size of the spot-size converter provided on the Si side to be nearly uniform.

There are several known methods, other than the above-described methods, to cope with some cases in which connection of the optical fiber to the outside is needed. For example, it is suggested that a V groove is formed on a planar lightwave circuit (PLC) side, the optical fiber is fixed into this V groove, and light is inputted into the optical circuit (refer to Japanese Patent Application Laid-open No. H08-313756). Although this suggestion does not have the description about the spot-size converter on the optical circuit side, which is needed in actuality, it is assumed that the one based on a tapered waveguide that reduces the width of the waveguide is employed.

It is also suggested that fiber is surface-coupled by a grating coupler (refer to, for example, JOURNAL OF QUANTUM ELECIRONICS, vol. 38, no. 7, 2002, p. 949), which is an effective method that allows light to pass through without cutting out an Si optical circuit side.

However, the suggestion in Japanese Patent Application Laid-open No. H08-313756 has a problem in controllability of the tip width of the tapered waveguide. Namely, in a range where the spot size is reduced to 10 μm to about several μm, sensitivity of the spot size to the tip width is high, which causes a problem that manufacturing of a core layer with appropriate dimension accuracy is difficult.

Further, the suggestion in JOURNAL OF QUANTUM ELECTRONICS, vol. 38, no. 7, 2002, p. 949 has such a problem that fiber fixing processing is difficult, and the suggestion is unfit for integration and packaging.

SUMMARY

According to one aspect that is disclosed, there is provided a spot-size converter having a first substrate, a first core that is provided on the first substrate and is extended from a first end configured to input/output light toward a second end, a second core that is formed by a plurality of cores, and formed at a position to be evanescent-coupled to the first core in a lamination direction, and moreover extended along a direction from the first end toward the second end, and a third core that has a taper unit whose cross section increases along the direction from the first end toward the second end, and that is formed at a position to be evanescent-coupled to the second core in the lamination direction, and moreover extended along the direction from the first end toward the second end.

According to another aspect that is disclosed, there is provided an integrated optical circuit device, in which an optical device is optically coupled to the third core of the above-described spot-size converter.

According to still another aspect that is disclosed, there is provided a manufacturing method of a spot-size converter, the method including: forming a first core that is provided on a first substrate and is extended from a first end toward a second end, and also forming a first alignment mark; forming a third core that is formed on a second substrate near the second end, and extended from the first end toward the second end, and also forming a second alignment mark that opposes to the first alignment mark; forming a second core that is formed by a plurality of cores at a position to be evanescent-coupled to the first core in a lamination direction and also evanescent-coupled to the third core in the lamination direction, when the first substrate and the second substrate are overlapped one another via a clad layer on the third core; and arranging and fixing the first substrate and the second substrate to each other so that the first alignment mark and the second alignment mark overlap each other.

According to the disclosed spot-size converter, the manufacturing method thereof, and the integrated optical circuit device, it is possible to facilitate coupling to the optical fiber, and to manufacture the spot-size converter with high accuracy.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
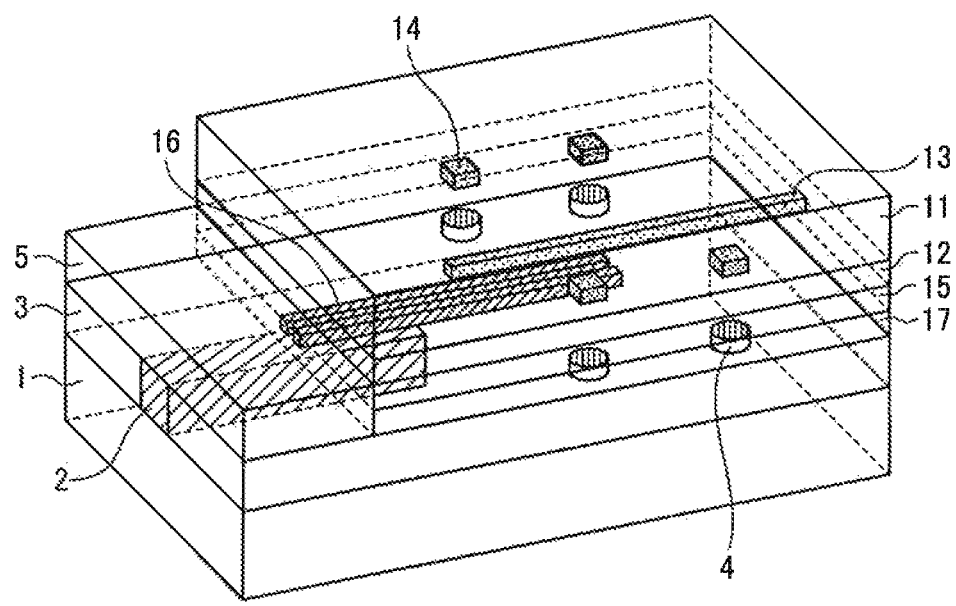
FIG. 1 is a conceptual perspective view of a spot-size converter according to an embodiment of the present invention.

Now, a spot-size converter according to an embodiment of the present invention will be explained with reference to FIG. 1 to FIG. 3. FIG. 1 is a conceptual perspective view of the spot-size converter according to the embodiment of the present invention, FIG. 2A is a conceptual sectional view of the spot-size converter according to the embodiment of the present invention, and FIG. 2B is a plan view illustrating a main part of the spot-size converter.

Figure 2A:
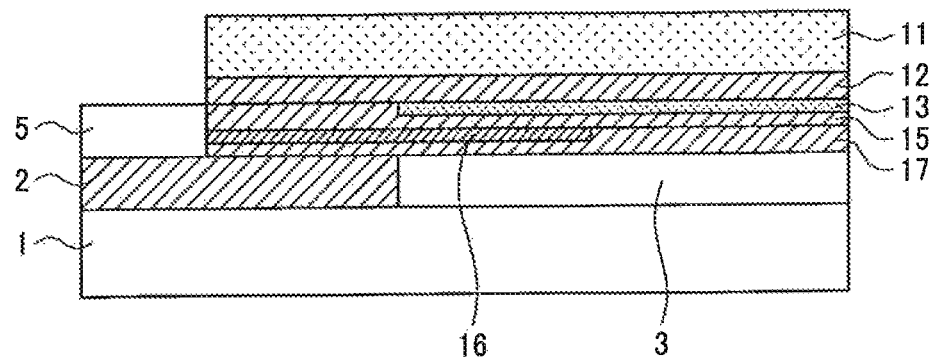
FIG. 2A is a conceptual sectional view of the spot-size converter and FIG. 2B is a plan view illustrating a main part of the spot-size converter according to the embodiment of the present invention.
Figure 2B:
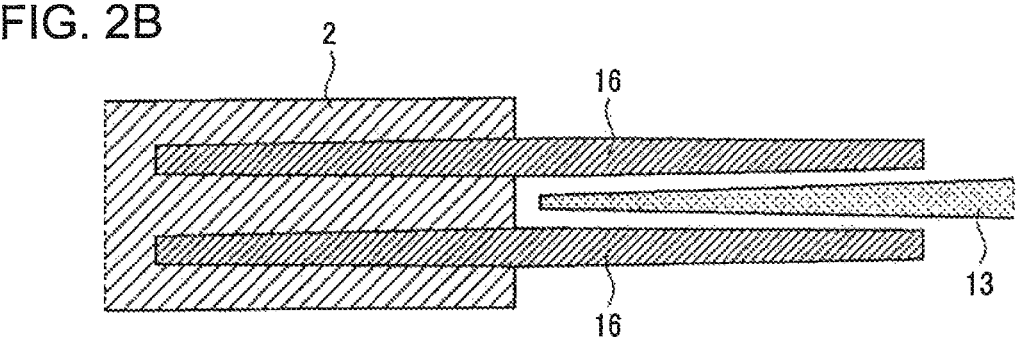
Figure 3:
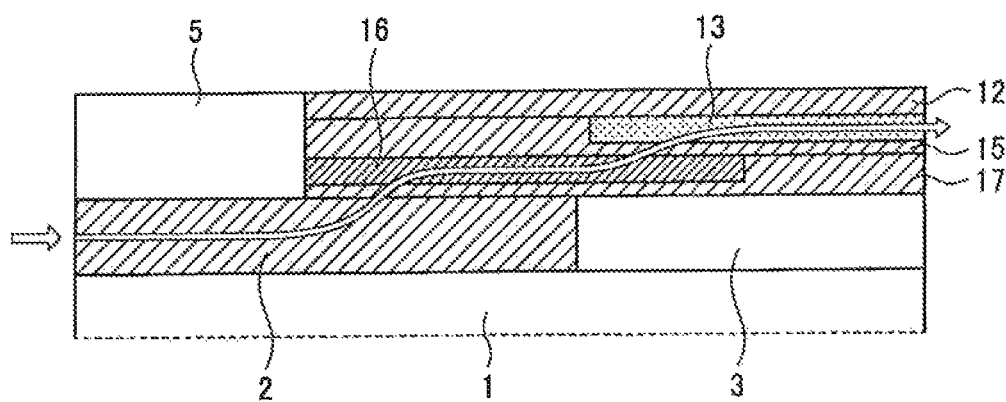
FIG. 3 is an explanatory view of the operation of the spot-size converter according to the embodiment of the present invention.

As illustrated in FIG. 1 and FIG. 2A, a first core 2 for inputting/outputting light is formed on a first substrate 1 to extend from a first end (left end of the first substrate) toward a second end (right end of the first substrate 1). This first core 2 is covered by a quartz clad 3, and first alignment marks 4 are formed on the quartz clad 3. On the top face on the first end side of the first core 2, a quartz clad 5 is partially provided. In this case, the first substrate 1 is typically a quartz substrate, and the first core 2 is typically a quartz core whose refractive index is increased by doping it with $GeO_2$ and $TiO_2$ to be greater than that of quartz ($SiO_2$).

Second cores 16 formed by a plurality of cores are formed at the position to be evanescent-coupled to the first core 2 in a lamination direction, and are extended along a direction from the first end toward the second end. The second cores 16 are formed by a dielectric film of SiN or the like, whose refractive index is greater than that of the first core 2, and a first clad 17 that is formed by an $SiO_2$ film is interposed between the second cores 16 and the first core 2. The second cores 16 are typically formed by two cores, but may be three or more cores. When the second cores 16 are formed by the two cores, each of the cores has thin width units at its both ends, and a maximum width unit at its center, as illustrated in FIG. 2B.

A third core 13, having a taper unit whose cross section increases along the direction from the first end toward the second end, is formed at the position to be evanescent-coupled to the second cores 16 in the lamination direction, and is extended along the direction from the first end toward the second end. The third core 13 is typically a single-crystal Si core that is formed by an SOI substrate. A BOX layer of the SOI substrate becomes a third clad 12. Further, a second clad 15 is provided between the third core 13 and the second cores 16.

It is desirable that the third core 13 is formed to have the taper unit that gradually increases its cross section in the direction from the first end toward the second end, and a fixed width unit that is connected to the taper unit and has a fixed width, so as to allow the light to transmit smoothly. A loss during propagation increases as the width of the third core 13 decreases, and therefore, a wide width unit having the width greater than that of the fixed width unit may be provided at the rear end of the fixed width unit. Further, it is desirable that the third core 13 extends from the position where the cross section of each of the second cores is maximized toward the second end, in the direction from the first end toward the second end.

The third core 13 and the second cores 16 are typically formed on a lamination plane of a second substrate 11 formed by an SOI substrate or the like, and second alignment marks 14 are formed on the second clad 15. The second alignment marks 14 may be formed simultaneously with when the third core 13 is formed and, when an optical element is formed on the output side of the third core 13, the second alignment marks 14 may be formed simultaneously with the step of forming a contact electrode that is formed on the optical element.

The substrate of the second substrate 11 is flip-chip bonded to the first substrate 1, so as to obtain the configuration of FIG. 1. At this time, the first alignment marks 4 and the second alignment marks 14 are used for the alignment. After the flip-chip bonding, the second substrate 11 may be thinned down or removed by polishing or etching, when thinning is needed before being mounted on a mobile device.

When the optical device is provided to be optically coupled to the third core 13, an integrated optical circuit device is formed. In this case, it is desirable that the optical device is monolithically formed on the second substrate 11, and the optical device may be formed by the same material as that of the third core 13. Alternatively, the optical device may be formed by recessing a single-crystal Si layer on the SOI substrate, and then epitaxially growing a Ge layer or the like on the remaining thin single-crystal Si layer.

The optical device in this case may be a combination of an optical modulator and a photodetector for detecting light outputted from the optical modulator. Alternatively, it may be a ring resonator to be directionally coupled to the third core 13, a waveguide to be directionally coupled to the ring resonator, and a diffraction grating provided in a part of the waveguide. In this case, the end face of an optical fiber, whose another end is optically coupled to a semiconductor optical amplifier, is arranged to oppose to the end face of the first core 2 on the first end side, and thus the ring resonator and the diffraction grating become an external resonator of the semiconductor optical amplifier, and laser oscillation is made possible.

Next, the operation of the spot-size converter according to the embodiment of the present invention will be explained with reference to FIG. 3. As illustrated in FIG. 3, propagation light having the spot size of about 10 μm is inputted from the optical fiber into the first core 2, at the incidence plane of the first end. As the light propagates through the first core 2, the second cores 16 appear. As the refractive index of the second cores 16 is made greater than that of the first core 2, a center of light intensity of the propagation light gradually moves to the second cores 16.

As the waveguide width of the second cores 16 is increased along a light propagation direction, the light propagates therethrough while being confined in the second cores 16. At the position where the core width of the second cores 16 is maximized, the third core 13 appears. The waveguide width of the second cores 16 is reduced along the light propagation direction, and on the contrary, the waveguide width of the third core 13 is increased. Thus, the propagation light gradually leaks out to the third core 13, and propagates to the third core 13 adiabatically.

Thus, it is possible for the spot-size converter of the present invention to guide the light inputted from the external optical fiber into the optical waveguide on the second substrate 11. According to the present invention, it is enough when the first core 2 has about the same size as the mode diameter of the optical fiber, which can be manufactured stably with current technologies.

Further, the second cores 16 form a single optical mode by the plurality of cores that are spaced in a horizontal direction, and the spot size is determined mainly by an interval between outermost cores. Even when there is a manufacturing error in the waveguide width of each of the second cores 16, it has little effect on the mode shape formed by the plurality of cores as a whole, and therefore, manufacturing tolerance can be increased.

In addition, no excessive loss is caused as long as the tip width of the third core 13 is the certain width or less. Consequently, the spot-size converter according to the present invention is able to increase the manufacturing tolerance and to improve a manufacturing yield.

FIRST PRACTICAL EXAMPLE

Next, a manufacturing process of the spot-size converter according to a first practical example of the present invention will be explained with reference to FIG. 4A and FIG. 4B to FIG. 8. In each of the drawings, FIG. A is a conceptual perspective view, and FIG. B is a conceptual cross section along a parallelogram in an alternate long and short dash line in FIG. A. Incidentally, FIG. 6B and FIG. 7B are illustrated so that the second cores and the third core are at the same positions. Further, FIG. C is a plan view of a main part, illustrating how the respective cores are overlapped one another.

Figure 4A:
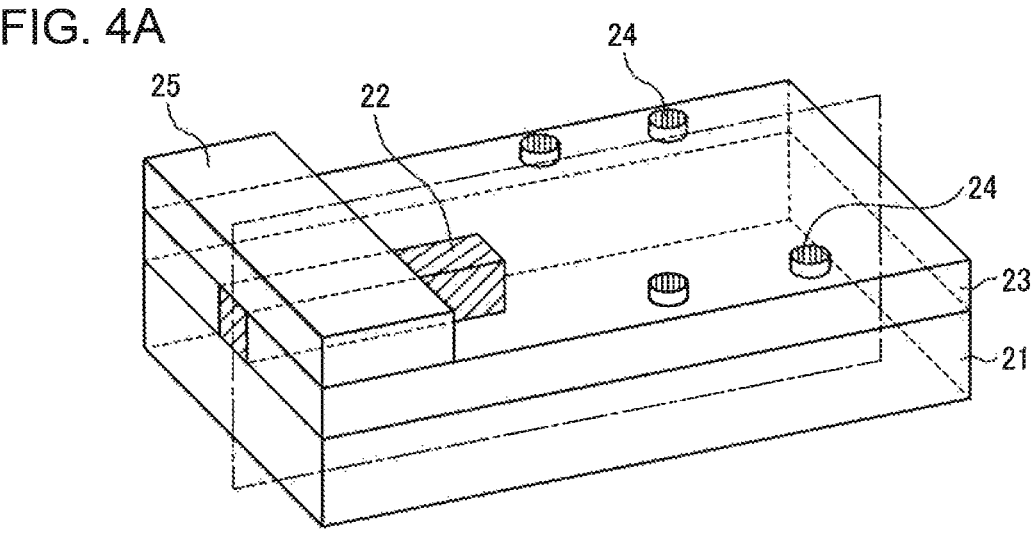
FIG. 4A and FIG. 4B are explanatory views illustrating a manufacturing process of the spot-size converter in part according to a first practical example of the present invention.
Figure 4B:
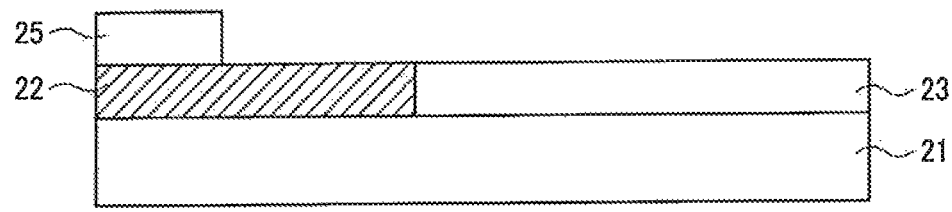

First, as illustrated in FIG. 4A and FIG. 4B, a Ti-doped $SiO_2$ film having the thickness of 10 μm is deposited on a quartz substrate 21, and then it is etched, so as to form a quartz core 22 having the width of 10 μm and the length of 100 μm. Therefore, the cross section of the quartz core 22 is 10 μm×10 μm.

Next, an $SiO_2$ film is deposited on the entire surface, and then it is planarized, so as to form a quartz clad 23. Next, an Al pattern is formed on the quartz clad 23, so as to form alignment marks 24. Thereafter, the input end face side of the quartz core 22 is covered by a quartz clad 25.

Figure 5A:
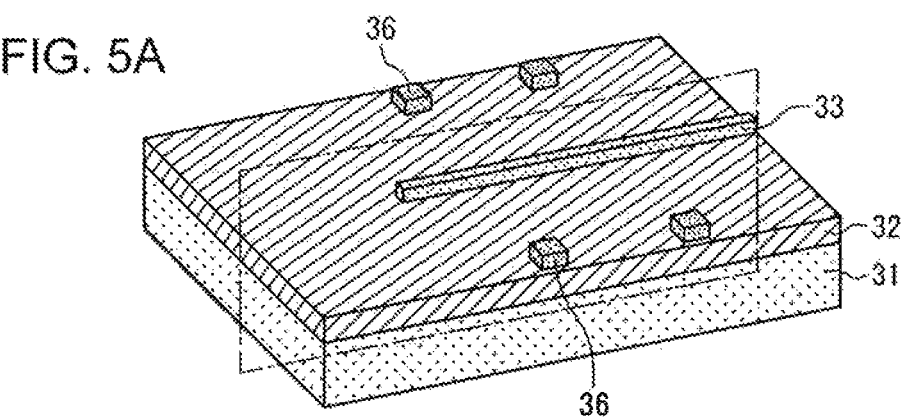
FIG. 5A, FIG. 5B and FIG. 5C are explanatory views illustrating the manufacturing process of the spot-size converter in part and subsequent to those of FIG. 4A and FIG. 4B, according to the first practical example of the present invention.
Figure 5B:
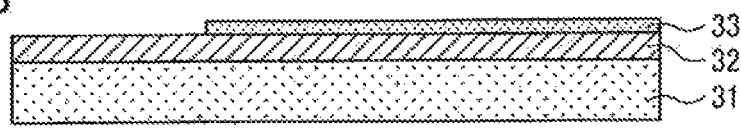
Figure 5C:
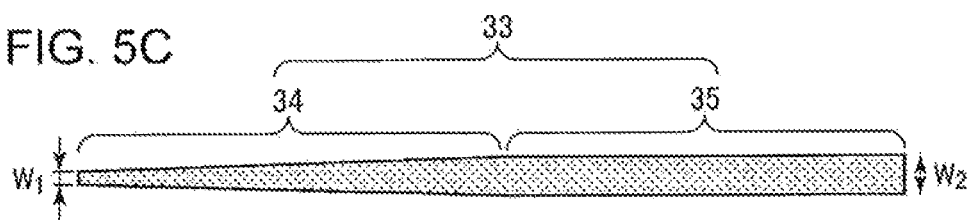

Meanwhile, as illustrated in FIG. 5A, FIG. 5B and FIG. 5C, an SOI substrate is provided, in which a single-crystal silicon layer having the thickness of 220 nm is provided on an Si substrate 31, via an $SiO_2$ film 32 having the thickness of 2 μm and being a BOX layer, and the single-crystal silicon layer is etched, so as to form a single-crystal Si core 33. At this time, alignment marks 36 are simultaneously formed by the single-crystal Si layer With regard to the core shape, as illustrated in FIG. 5C, the single-crystal Si core 33 as the third core has a taper part 34 and a fixed width part 35 having the width $w_2$ of 450 nm. The width $w_1$ at the tip end of the taper part 34 is 150 nm, and the total length is 200 μm.

Figure 6A:
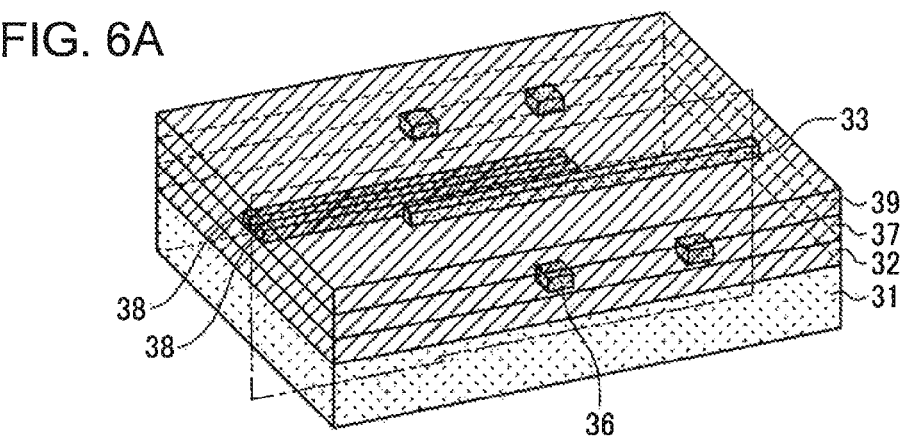
FIG. 6A, FIG. 6B and FIG. 6C are explanatory views illustrating the manufacturing process of the spot-size converter in part and subsequent to those of FIG. 5A, FIG. 5B and FIG. 5C, according to the first practical example of the present invention.
Figure 6B:
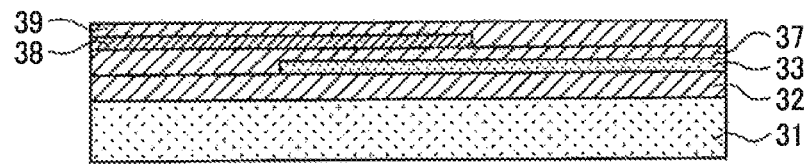
Figure 6C:
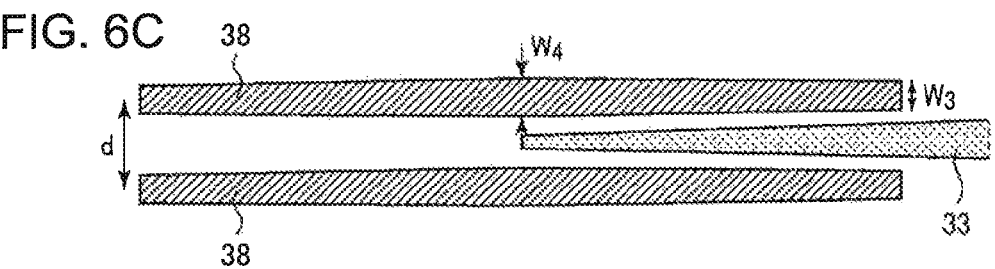

Next, as illustrated in FIG. 6A, FIG. 6B and FIG. 6C, an $SiO_2$ film 37 is formed in such a manner that its thickness on the single-crystal Si core 33 is 1 μm, so as to form a clad layer. Then, an SiN film having the thickness of 300 nm is deposited, and is etched to form SiN cores 38.

Each of the SiN cores 38 has a tapered shape that is tapered at both ends, in which the width $w_3$ at the tip end is 200 nm, and the width $w_4$ of the maximum width unit at the center is 700 nm. An interval d between the two SiN cores 38 is 1 μm. In addition, the SiN cores 38 and the single-crystal Si core 33 are arranged so that the position of the maximum width units of the SiN cores 38 and the position of the tip end of the single-crystal Si core 33 are in agreement with one another. Next, an $SiO_2$ film 39 is provided in such a manner that its thickness on the SiN core 38 is 1 μm, so as to form a clad layer.

Figure 7A:
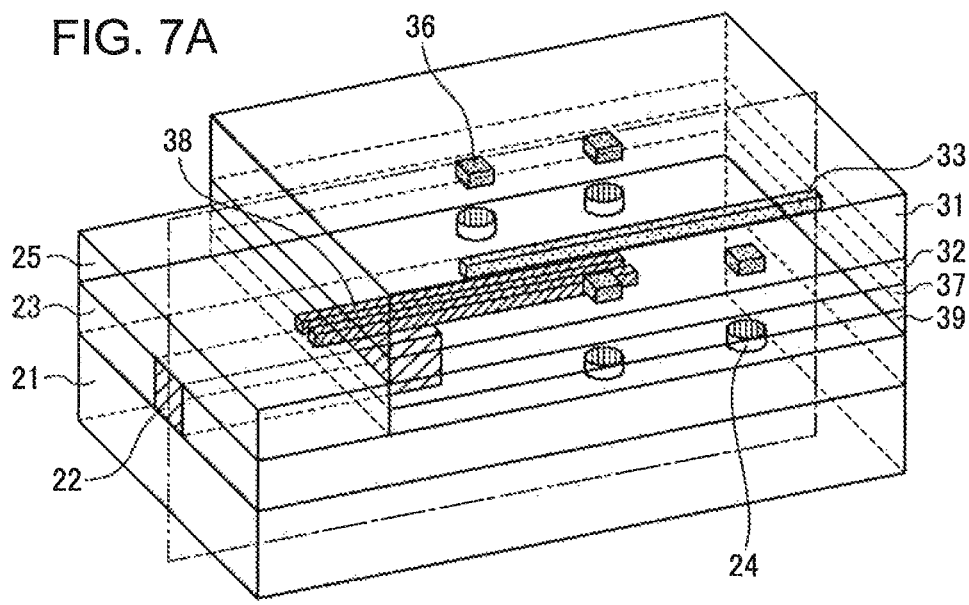
FIG. 7A and FIG. 7B are explanatory views illustrating the manufacturing process of the spot-size converter in part and subsequent to those of FIG. 6A, FIG. 6B and FIG. 6C, according to the first practical example of the present invention.
Figure 7B:
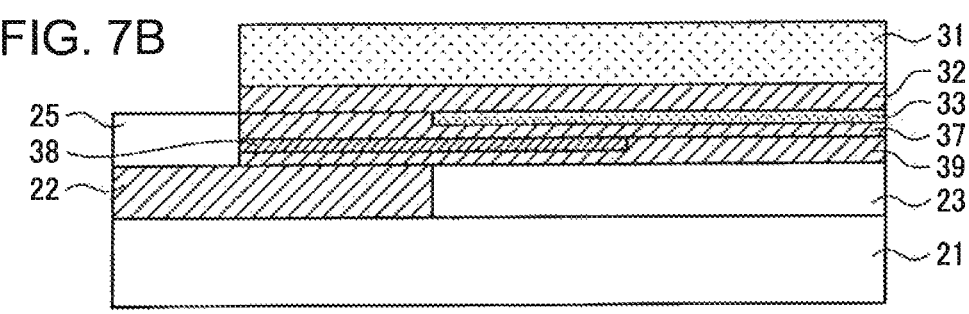

Next, as illustrated in FIG. 7A and FIG. 7B, the Si substrate 31, on which the optical circuit is formed, is aligned, flip-chip bonded, and fixed to the quartz substrate 21. At this time, infrared rays are irradiated from the lower side of the quartz substrate 21 and operated so that the alignment marks 24 and the alignment marks 36 are in agreement with one another, so as to perform the alignment.

Figure 8:
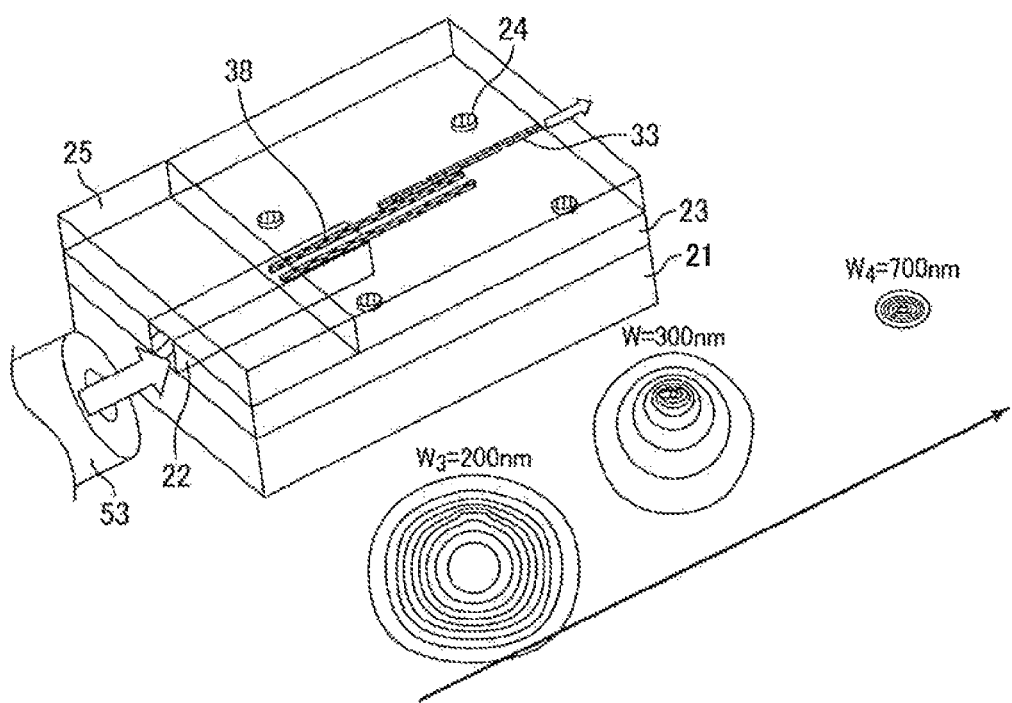
FIG. 8 is an explanatory view of a light transmission state in the spot-size converter according to the first practical example of the present invention.

FIG. 8 is an explanatory view of a light transmission state in the spot-size converter according to the first practical example of the present invention. When light is inputted from an optical fiber 53, the light is made incident on the quartz core 22, propagates therethrough, and, at the position where the SiN cores 38 appear, senses the wide spot size of the SiN cores 38, and is adiabatically coupled to the SiN cores 38. As the waveguide width of the SiN cores 38 is increased, the light is confined in the SiN cores 38. When the width $w_4$ of the SiN cores 38 is increased to 700 nm, the coupling to the SiN cores 38 is almost completed. Thereafter, at the position where the single-crystal Si core 33 appears, the light senses the wide spot side of the single-crystal Si core 33, and adiabatically propagates to the single-crystal Si core 33.

With the spot-size converter according to the first practical example of the present invention, passive alignment that uses the alignment marks is employed where the light propagates from the quartz core 22 to the SiN cores 38, and its accuracy is ±0.5 μm or less. No loss due to misregistration is caused within this accuracy, with respect to the light having the spot size of 10 μm and being inputted from the optical fiber 53.

In the propagation of the light from the SiN cores 38 to the single-crystal Si core 33, the two waveguides that are spaced in the horizontal direction are used in the SiN cores 38, and therefore, the manufacturing tolerance to the tip width precision of the respective SiN cores 38 can be increased. This is because, even when there is a manufacturing error in the tip width of each of the SiN cores 38, it has little effect on the interval between the waveguides. Consequently, the spot-size converter according to the first practical example is able to increase a manufacturing yield and to reduce costs.

Even though the two SiN cores 38 are used to guide the light to an upper layer, according to this first practical example, the number is not necessarily two, as long as one mode can be formed by a plurality of cores. Further, the single-crystal Si core 33 is arranged at the center of the two SiN cores 38 according to this first practical example, but this is not restrictive. Even though the single-crystal Si core 33 is shifted laterally by 0.5 μm, for example, and is arranged under either one of the SiN cores 38, the light guided through the single-crystal Si core 33 can be adiabatically guided to the upper layer.

SECOND PRACTICAL EXAMPLE

Figure 9:
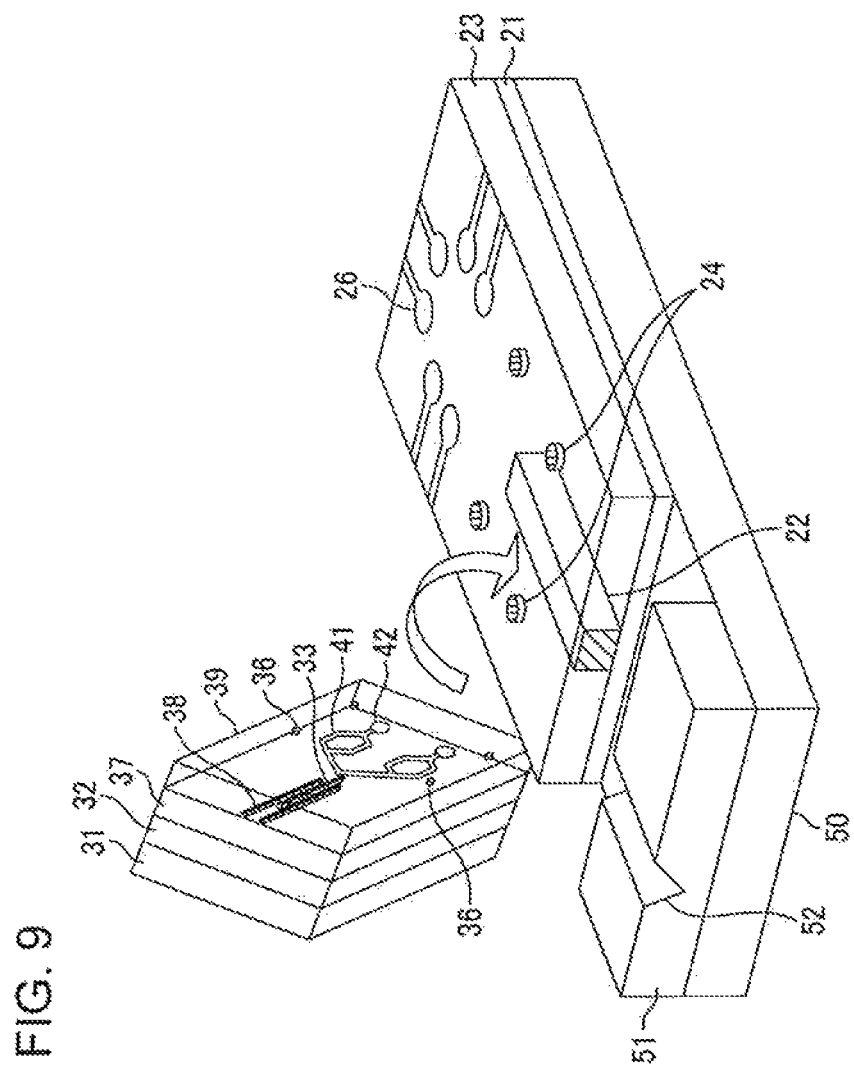
FIG. 9 is an explanatory view illustrating the configuration of an integrated optical circuit device according to a second practical example of the present invention.

Next, an integrated optical circuit device according to a second practical example of the present invention will be explained with reference to FIG. 9. As a basic manufacturing process is the same as that of the above-described first practical example, an explanation will be given to its configuration only. FIG. 9 is an explanatory view illustrating the configuration of the integrated optical circuit device according to the second practical example of the present invention, in which a PLC platform 50 made of quartz is processed, the quartz substrate 21 and a fiber mount base 51 are formed, and a V groove 52 for mounting and fixing the optical fiber therein is formed in the fiber mount base 51.

Similarly to the above-described first practical example, the quartz core 22, the quartz clad 23, and the alignment marks 24 are formed on the quartz substrate 21 (illustration of the quartz clad 25 is omitted). According to the second practical example, optical device electrodes 26 are formed by using the formation process of the alignment marks 24.

Meanwhile, the single-crystal Si core 33, the alignment marks 36, and the SiN cores 38 are formed via the respective clad layers on the Si substrate 31. In the formation process of the single-crystal Si core 33, an optical modulator 41 and photodiodes 42 are formed by using the single-crystal Si layer. On the optical modulator 41 and the photodiodes 42, connection electrodes (illustration is omitted) are provided at positions corresponding to the optical device electrodes 26.

Next, similarly to the first practical example, the Si substrate 31 is flip-chip bonded to the quartz substrate 21 and thus, the basic configuration of the integrated optical circuit device according to the second practical example of the present invention is completed. According to this second practical example, an optical signal that is inputted from the optical fiber fixed in the V groove 52 into the quartz core 22 is propagated into the optical circuit, modulated in the optical modulator 41 to which an electric signal is supplied from the optical device electrodes 26 on the quartz substrate 21, and received in the photodiodes 42. The received electric signal is taken out by a signal line that is electrically wired onto the quartz substrate 21.

Similar changes as those of the above-described first practical example can also be made in this second practical example. According to the second practical example, the alignment marks 36 may be formed by electrode material by using the formation process of the electrodes to the optical device.

THIRD PRACTICAL EXAMPLE

Figure 10:
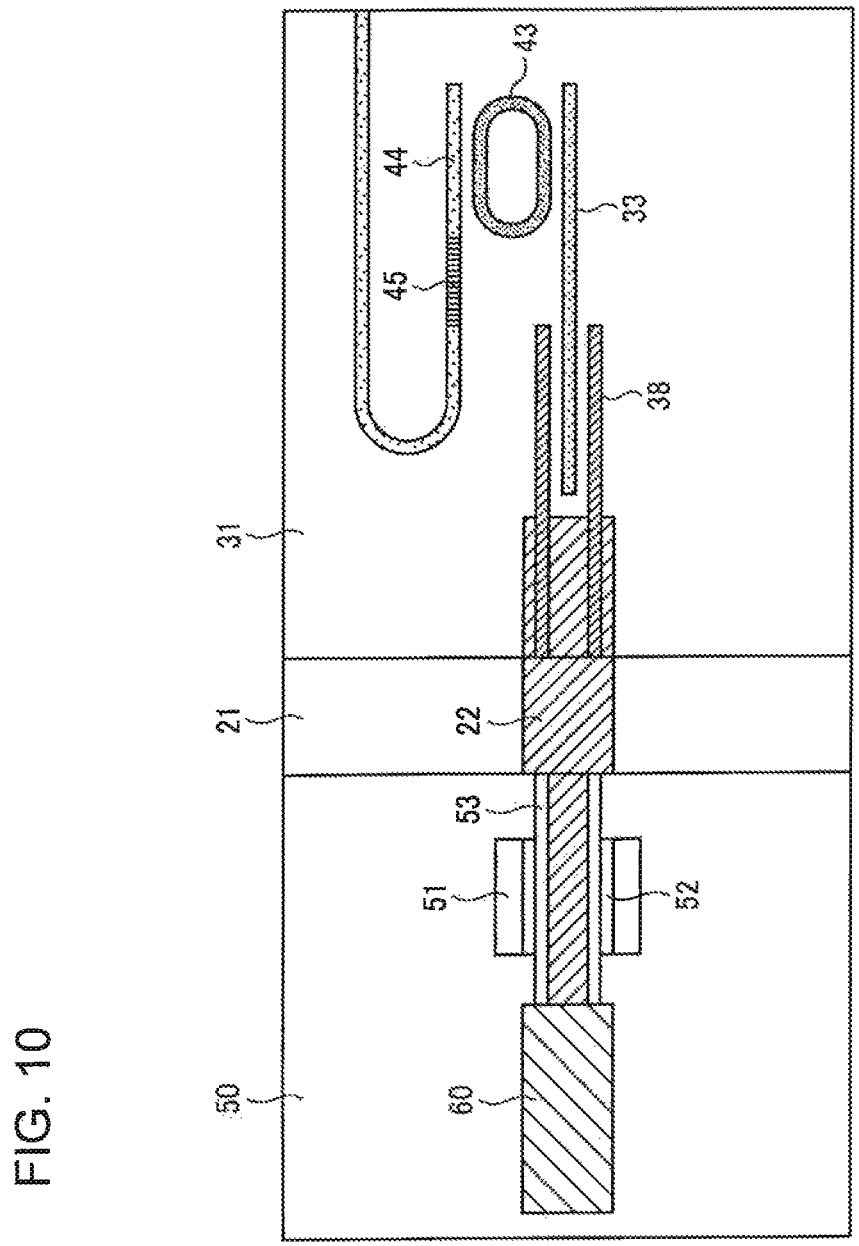
FIG. 10 is a conceptual perspective top view of an integrated optical circuit device according to a third practical example of the present invention.

Next, an integrated optical circuit device according to a third practical example of the present invention will be explained with reference to FIG. 10. As a basic manufacturing process is the same as that of the above-described first practical example, an explanation will be given to its configuration only. FIG. 10 is a conceptual perspective top view of the integrated optical circuit device according to the third practical example of the present invention, and is a perspective top view after the flip-chip bonding.

Here, the PLC platform 50 made of quartz is also processed, the quartz substrate 21 and the fiber mount base 51 are formed, and the V groove 52 for mounting and fixing the optical fiber therein is formed in the fiber mount base 51. Similarly to the above-described first practical example, the quartz core 22, the quartz clad 23, and the alignment marks 24 are formed on the quartz substrate 21.

Meanwhile, the single-crystal Si core 33, the alignment marks 36, and the SiN cores 38 are formed via the respective clad layers on the Si substrate 31. In the formation process of the single-crystal Si core 33, a ring resonator 43 to be directionally coupled to the single-crystal Si core 33, a waveguide 44 to be directionally coupled to the ring resonator 43 are formed by using the single-crystal Si layer, and a diffraction grating 45 is formed in a part of the waveguide 44. Incidentally, the diffraction grating 45 may be formed by providing periodical unevenness in a film thickness direction, or by providing the periodical unevenness in a width direction. In this case, the unevenness is provided in the width direction.

Next, similarly to the first practical example, the Si substrate 31 is flip-chip bonded to the quartz substrate 21. Then, a low reflection side of a reflective SOA 60 is connected to an optical fiber 53, and another end of the optical fiber 53 is fixed in the V groove 52. Light inputted from the optical fiber 53 performs laser operation by an external resonator formed by the ring resonator 43 and the diffraction grating 45 forming a Bragg reflector. Thereby, it is possible to realize an external resonator-type light source. In the above-described practical examples, although the quartz clad 3, 5, 23, 25, and the quartz core 22 consist of crystalline quartz, they may be replaced with $SiO_2$ which is not quartz. $SiO_2$ which is not quartz is formed, for example of CVD (chemical-vapor deposition) method.

Here, the following claims are added with respect to the embodiment of the present invention including the first practical example to the third practical example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A spot-size converter comprising:
   a first substrate;
   a first core that is provided on the first substrate and is extended from a first end configured to input/output light toward a second end;
   a second core that is formed by a plurality of cores, and formed at a position to be evanescent-coupled to the first core in a lamination direction, and moreover extended along a direction from the first end toward the second end; and
   a third core that has a taper unit whose cross section increases along the direction from the first end toward the second end, and that is formed at a position to be evanescent-coupled to the second core in the lamination direction, and moreover extended along the direction from the first end toward the second end.

2. The spot-size converter according to claim 1, wherein the third core is provided on a lamination plane of a second substrate, and
the second core is provided on the third core via a clad layer.

3. The spot-size converter according to claim 2, wherein the first substrate and the second substrate have thereon alignment marks respectively at positions corresponding to each other.

4. The spot-size converter according to claim 1, wherein the third core includes the taper unit that gradually increases the cross section in the direction from the first end toward the second end, and a fixed width unit that has a fixed width and is connected to the taper unit.

5. The spot-size converter according to claim 4, wherein the third core includes a wide width unit having a width greater than that of the fixed width unit at a rear end of the fixed width unit having the fixed width.

6. The spot-size converter according to claim 1, wherein the third core extends from a position, where the cross section of the second core is maximized, toward the second end, in the direction from the first end toward the second end.

7. The spot-size converter according to claim 2, wherein the second substrate is an SOI substrate in which a single-crystal silicon layer is provided on a single-crystal silicon substrate via an $SiO_2$ film, and the third core is formed by the single-crystal silicon layer.

8. An integrated optical circuit device, wherein an optical device is optically coupled to a third core of a spot-size converter according to claim 1.

9. The integrated optical circuit device according to claim 8, wherein the optical device is provided on a second substrate of the spot-size converter.

10. The integrated optical circuit device according to claim 8, wherein the optical device includes an optical modulator and a photodetector that detects light outputted from the optical modulator.

11. The integrated optical circuit device according to claim 8, wherein the optical device includes a ring resonator that is directionally coupled to the third core, a waveguide that is directionally coupled to the ring resonator, and a diffraction grating that is formed in a part of the waveguide, and an end face of a first core on a first end side is opposed to an end face of an optical fiber, whose another end is optically coupled to a semiconductor optical amplifier.

12. A manufacturing method of a spot-size converter, the method comprising:
   forming a first core that is provided on a first substrate and is extended from a first end toward a second end, and also forming a first alignment mark;
   forming a third core that is formed on a second substrate near the second end, and extended from the first end toward the second end, and also forming a second alignment mark that opposes to the first alignment mark;
   forming a second core that is formed by a plurality of cores at a position to be evanescent-coupled to the first core in a lamination direction and also evanescent-coupled to the third core in the lamination direction, when the first substrate and the second substrate are overlapped one another via a clad layer on the third core; and
   arranging and fixing the first substrate and the second substrate to each other so that the first alignment mark and the second alignment mark overlap each other.

* * * * *